Nov. 14, 1950  F. E. COLE  2,529,798
MACHINE FOR APPLYING PRESSURE TO SHOE BOTTOMS
Filed Feb. 5, 1947  9 Sheets-Sheet 2

Inventor
Frank E. Cole
By his Attorney

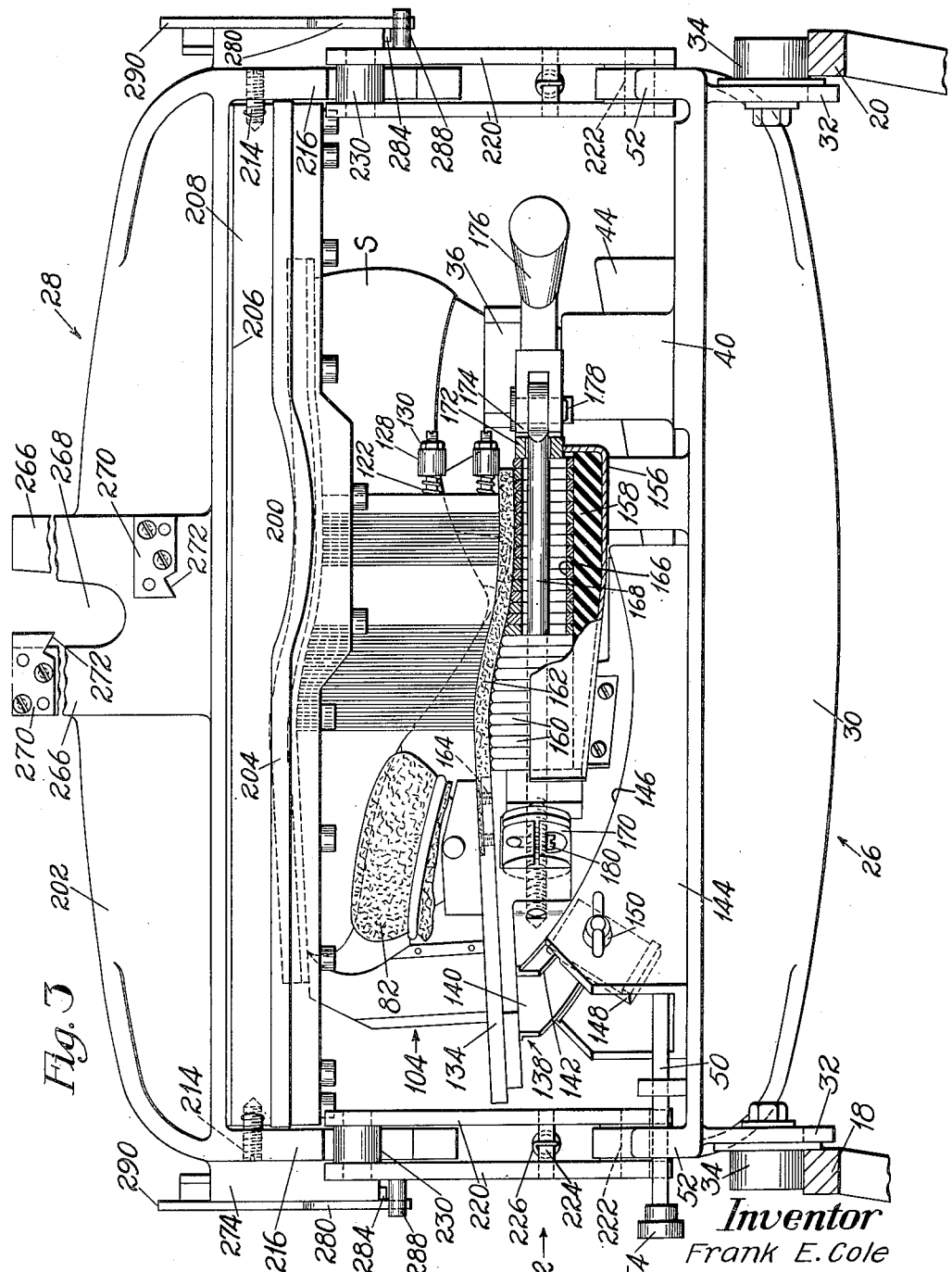

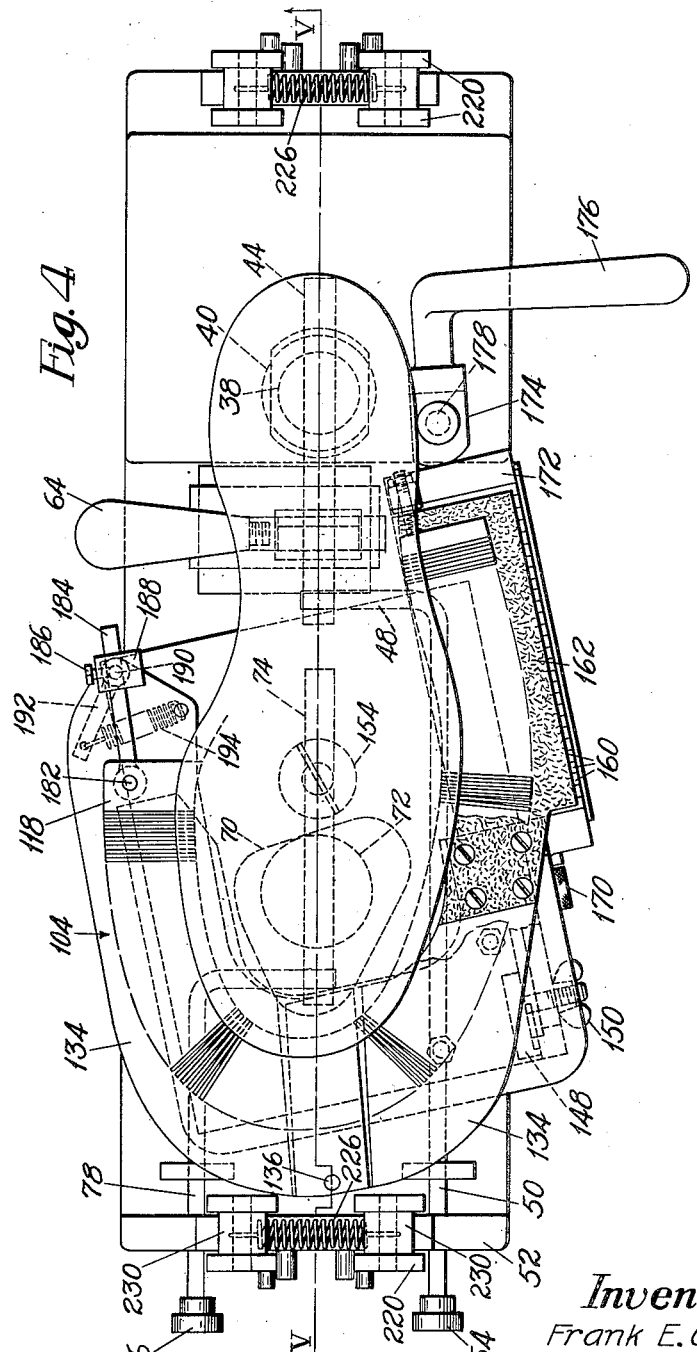

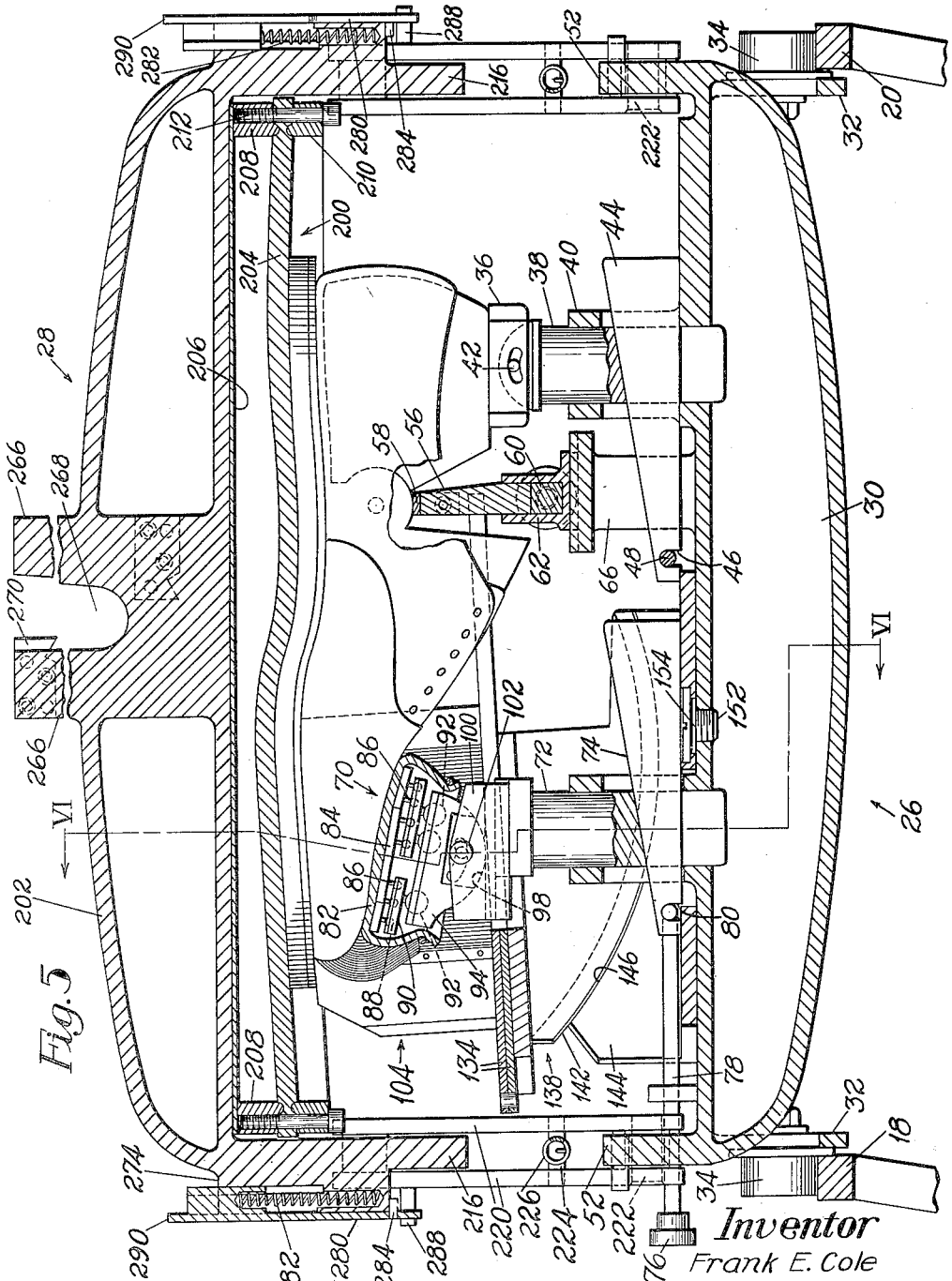

Nov. 14, 1950      F. E. COLE      2,529,798
MACHINE FOR APPLYING PRESSURE TO SHOE BOTTOMS
Filed Feb. 5, 1947      9 Sheets-Sheet 6
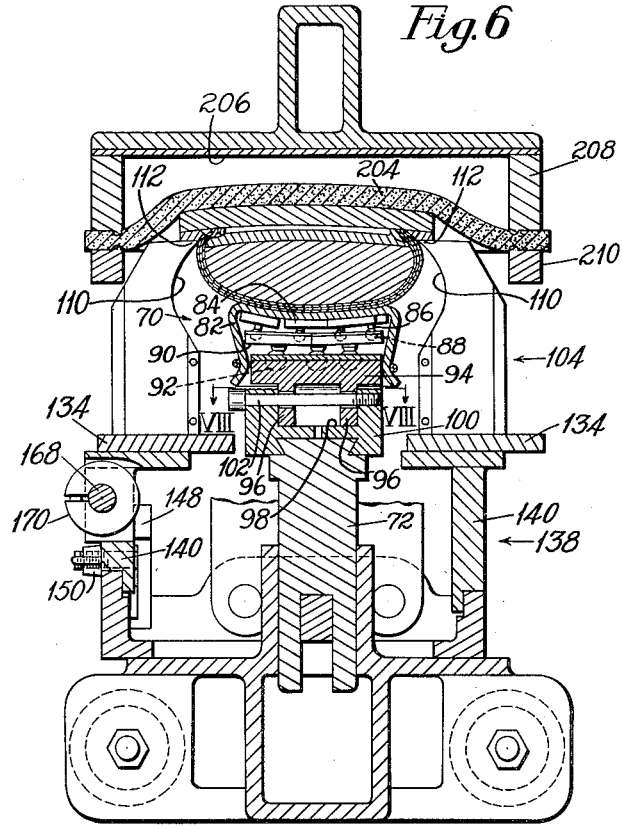
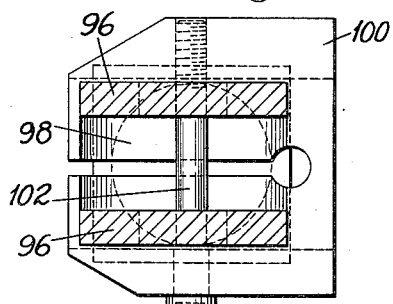
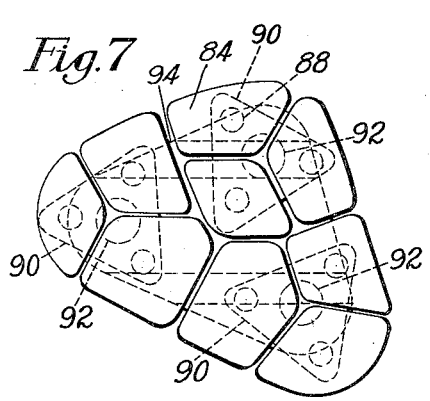
Inventor
Frank E. Cole
By his Attorney

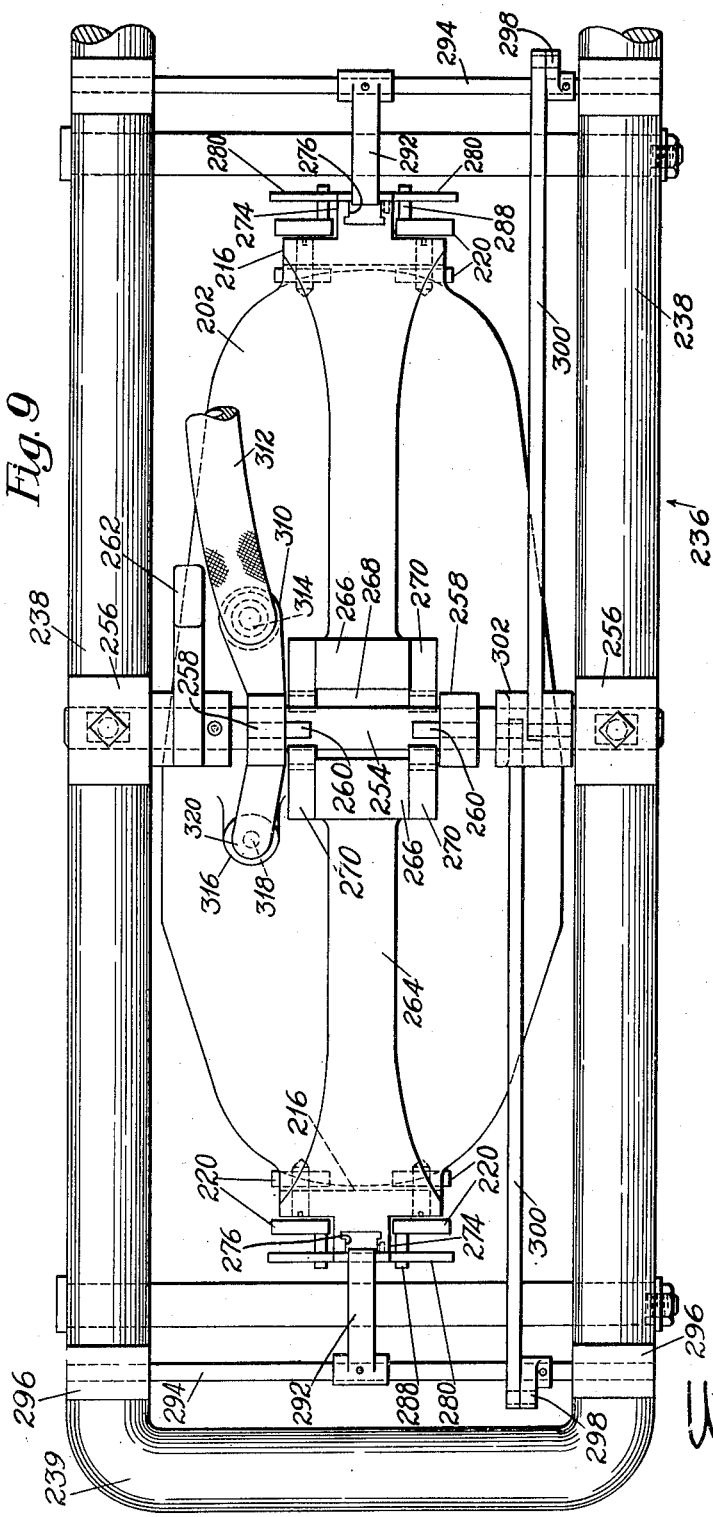

Nov. 14, 1950 F. E. COLE 2,529,798
MACHINE FOR APPLYING PRESSURE TO SHOE BOTTOMS
Filed Feb. 5, 1947 9 Sheets-Sheet 8
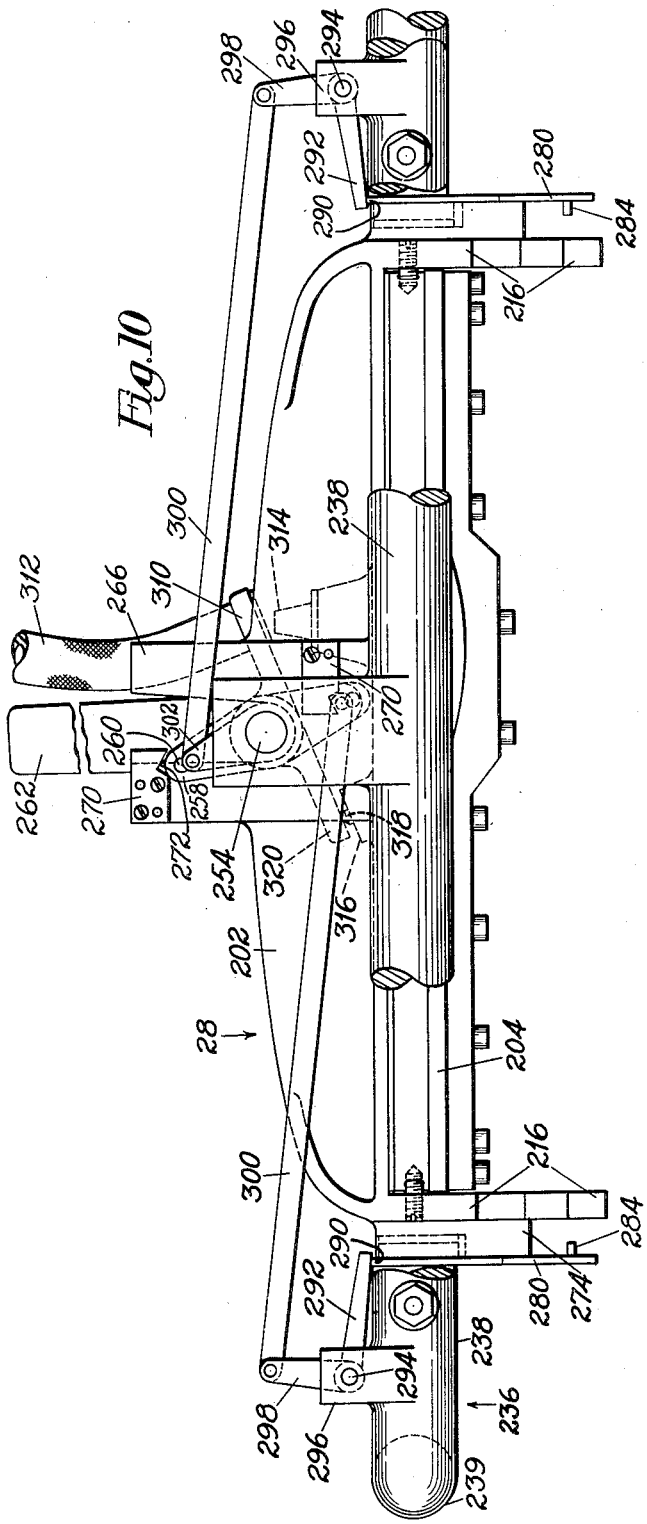
Inventor
Frank E. Cole
By his Attorney Nov. 14, 1950          F. E. COLE          2,529,798
MACHINE FOR APPLYING PRESSURE TO SHOE BOTTOMS
Filed Feb. 5, 1947          9 Sheets-Sheet 9
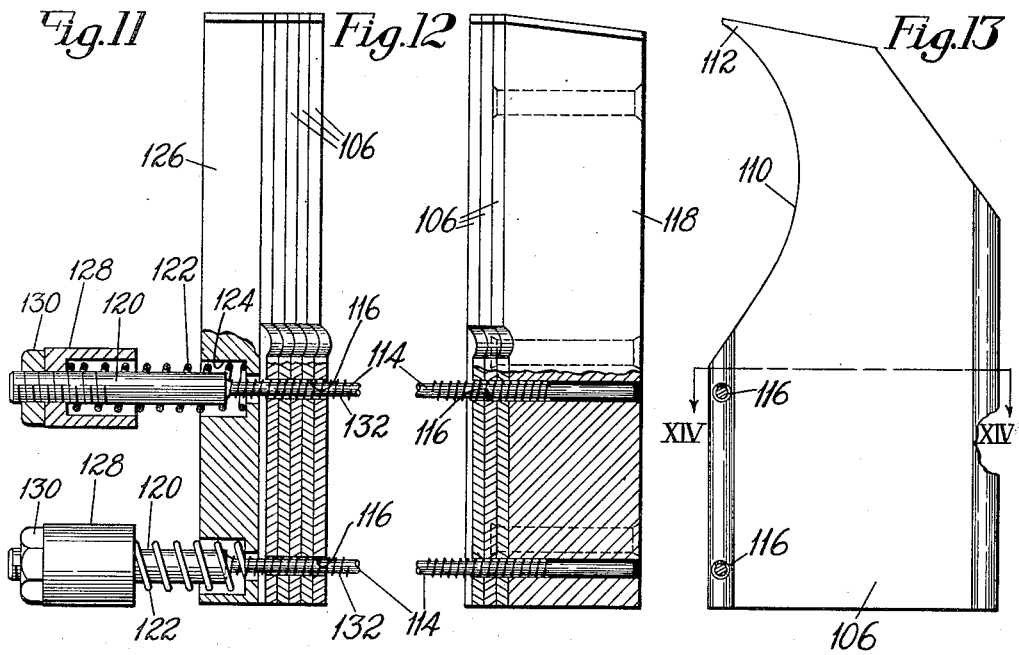
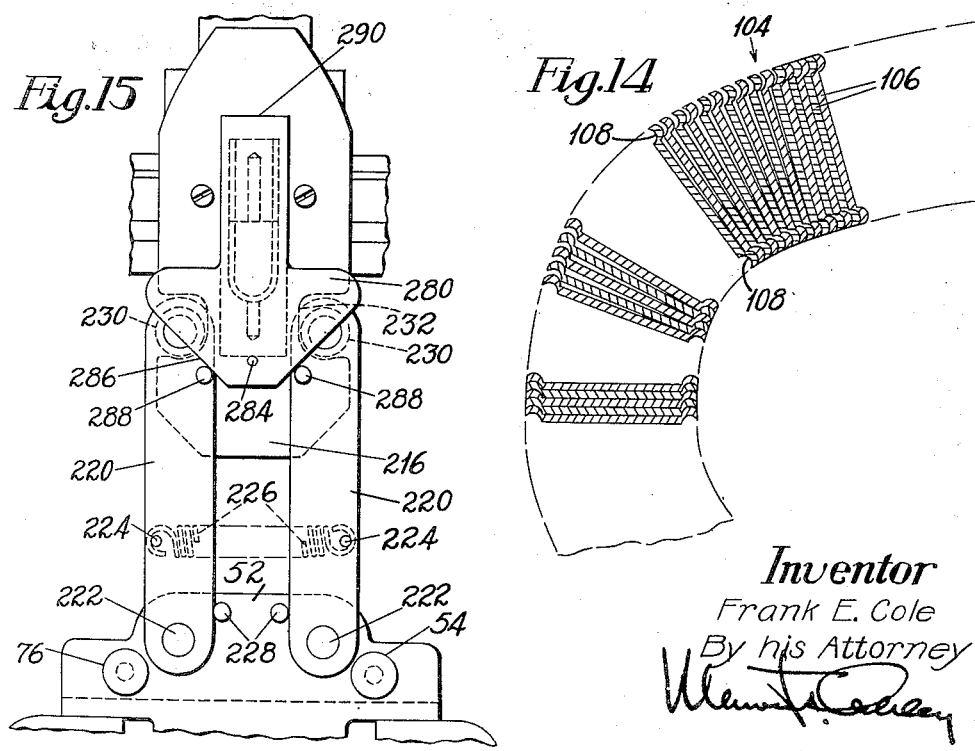
Inventor
Frank E. Cole
By his Attorney Patented Nov. 14, 1950

2,529,798

UNITED STATES PATENT OFFICE 2,529,798

MACHINE FOR APPLYING PRESSURE TO SHOE BOTTOMS

Frank E. Cole, Manchester, Mass., assignor to United Shoe Machinery Corporation, Flemington, N. J., a corporation of New Jersey Application February 5, 1947, Serial No. 726,609

26 Claims. (Cl. 12—36)

This invention relates to machines for use in the manufacture of shoes and more particularly to machines for applying pressure to shoe bottoms.

The invention is illustrated herein as embodied in a machine adapted to cement attach soles by pressure to the bottoms of shoes. An object of the invention is to provide an improved machine of the type in which a plurality of press members are movable into and out of a loading station, there being means at the loading station for moving a pressure-applying member into and out of operative relation to a shoe on a support which forms part of the press member. This is accomplished in accordance with a feature of the invention by providing a table on which the press members may be moved by the operator into and out of the loading station, each of the press members comprising a shoe support and a pressure-applying member movable by mechanism at the loading station into and out of operative relation to the shoe support. The pressure-applying member is locked in operative relation to the shoe support upon movement of the pressure-applying member into such position and the mechanism for moving the pressure-applying member out of operative relation to the shoe support includes means for releasing the locking means.

In accordance with another feature of the invention each of the press members includes a support for holding a shoe in inverted position and an inflatable pressure-applying pad movable into and out of operative relation to the shoe support and arranged prior to introduction of pressure fluid into the pad to be locked in operative relation to the shoe support.

Another object of the invention is to provide an improved machine for applying sole-attaching pressure to the bottom of a welt shoe. As illustrated herein, in accordance with a further feature of the invention, the shoe is supported in inverted position and associated with the supporting means for the shoe is a support for the welt. This welt support is carried by a bed and is so constructed that it is conformable to lateral and heightwise curvatures of the welt. One portion of the bed is formed of a plurality of vertically movable plates providing a supporting surface, the contour of which may be varied to correspond to the heightwise curvatures of the welt. Provision is made for clamping the plates of the supporting bed together thereby to resist relative movements thereof under the sole-attaching pressure to be applied to the shoe bottom.

In accordance with a further feature of the invention the welt support is formed of a plurality of substantially flat plate members which are urged into face-to-face relation and which have nested curved vertical edge portions which permit relative pivotal movements of the plates to conform to the outline of the forepart of a shoe and which have other edge portions providing a welt supporting surface.

In accordance with a still further feature of the invention the toe of the shoe is supported by an improved toe support which is formed of a plurality of small plate members which are individually mounted for limited universal rocking movements, these plate members being arranged and supported in groups on similarly mounted supports so that the entire group of plates may conform to the curvatures of the toe end of the last. These plate members are provided with a leather cover with which the toe of the shoe contacts over a relatively large area, the arrangement being such that the pressure throughout the toe support is substantially uniformly divided and the unit pressure is not excessive.

The above and other features of the invention, including various details of construction and novel combinations of parts, will now be described by reference to the accompanying drawings and pointed out in the claims.

In the drawings,

Fig. 3 is a side elevation partly in section of one of the press members of the machine;

Fig. 4 is a plan view of one of the press members showing a shoe in position thereon but with the pressure-applying member removed therefrom;

Fig. 5 is a section on the line V—V of Fig. 4, the pressure-applying member being shown in its operative position;

Fig. 6 is a section on the line VI—VI of Fig. 5;

Fig. 7 is a plan view of the toe support with its cover removed;

Fig. 8 is a section on the line VIII—VIII of Fig. 6;

Fig. 9 is a plan view of one of the pressure-applying members and the means for lifting it from the shoe support;

Fig. 10 is a side elevation of one of the pressure-applying members and the lifting means;

Figs. 11, 12, 13 and 14 are detail fragmentary views on a large scale of the welt support, Fig. 14 being a section on the line XIV—XIV of Fig. 13, and Fig. 15 is an end elevation of one of the mechanisms by which the pressure-applying member is locked in its operative position to the shoe support.

Figure 1:
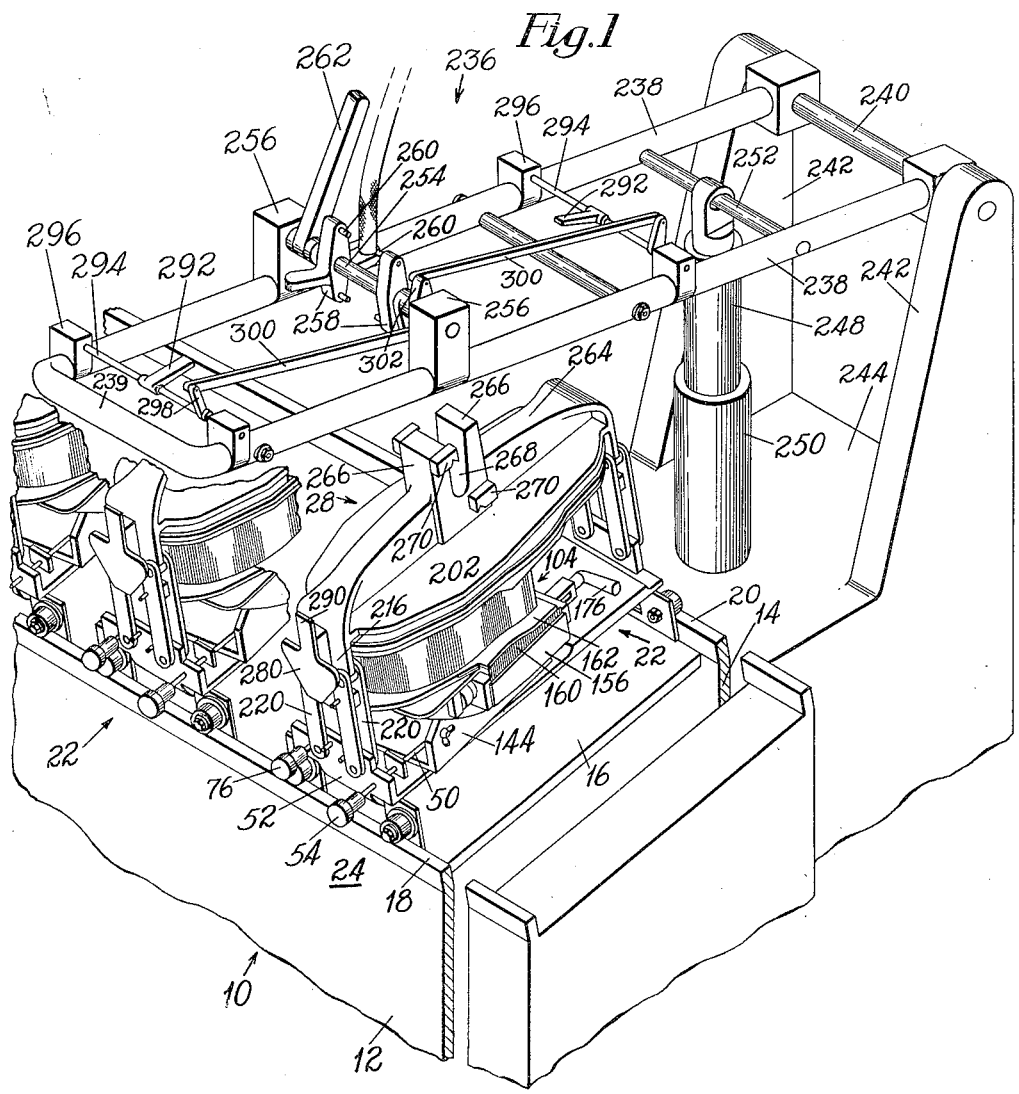
Fig. 1 is a fragmentary angular view of the upper portion of a machine embodying the invention.
Figure 2:
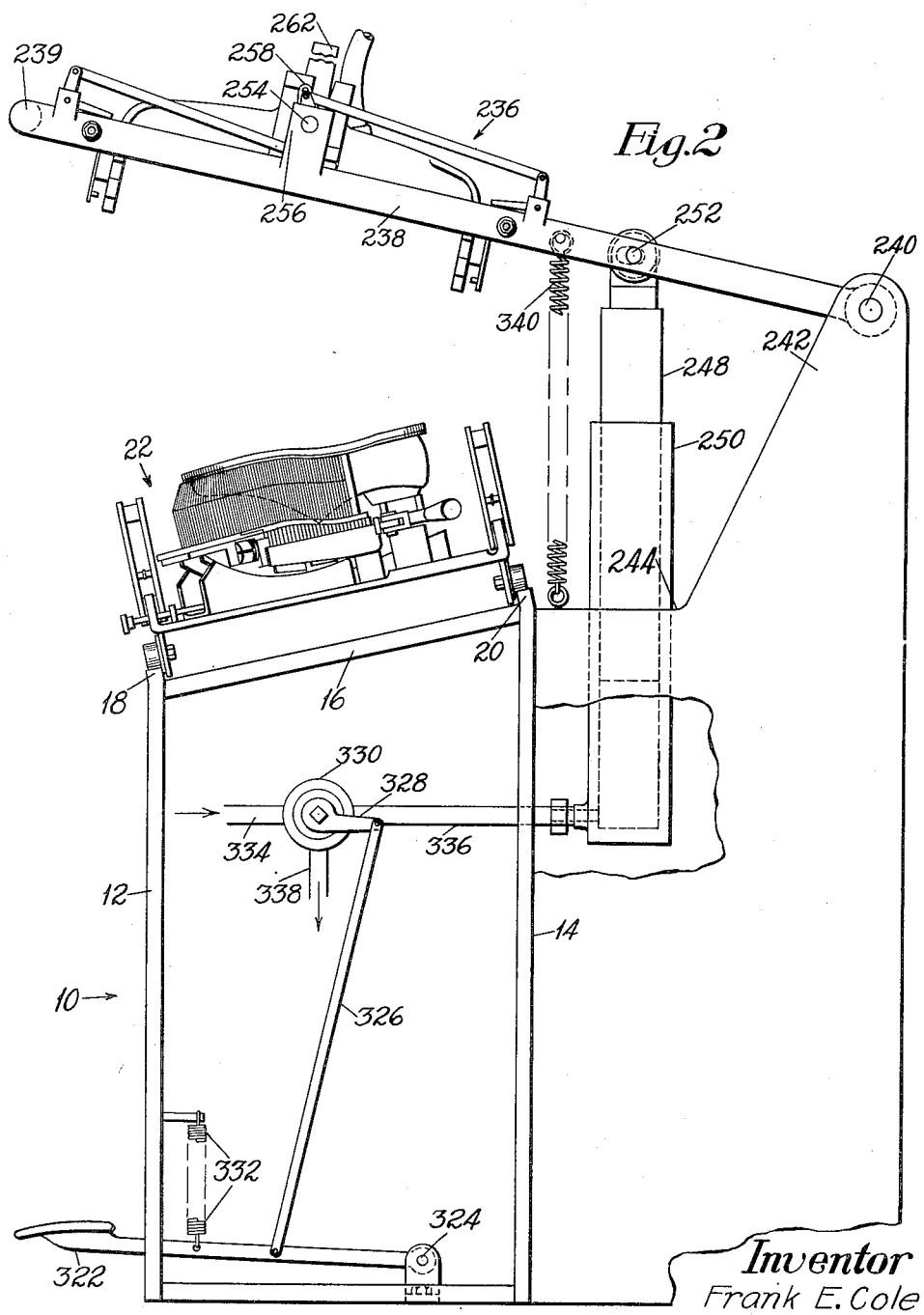
Fig. 2 is a side elevation of the machine.

As illustrated in Figs. 1 and 2 the machine comprises a table 10 having front and rear walls 12 and 14 which extend upwardly above a top wall 16 to form rails 18 and 20 of a track. These tracks support a plurality of press members 22 which may be moved by the operator into and out of a loading station 24 (Fig. 1). The rail 20 is higher than the rail 18 so that the press members are inclined toward the operator thereby to facilitate introduction and removal of a shoe into and from the press member. Each of the press members includes a shoe support 26 (Figs. 3 and 5) and a pressure-applying member 28 which is movable by mechanism to be described into and out of operative relation to the shoe support. Each shoe support comprises a carriage 30 having depending flanges 32 carrying flanged rolls 34 which rest on the tracks 18 and 20 and facilitate movement of the press members by the operator lengthwise of the table 10 (Figs. 1 and 2).

The shoe support includes provision for supporting a shoe S in inverted position in the sole-attaching operation, there being means for supporting the forepart, hinge and heel end of the last, as well as means for supporting the welt of the shoe, as will be described. The heel end of the last rests on a heel support 36 (Fig. 5) carried for rocking movement on the upper end of a post 38 slidable in a sleeve 40 extending upwardly from the carriage 30. The support 36 is connected to the post 38 by a pin and slot connection 42 which permits limited rocking movements of the support 36 about an axis extending transversely of a shoe supported thereon, thereby to accommodate variations in the plane in which the top surface of the cone of the last lies. The lower end of the post 38 is bifurcated, between the furcations of which is located a slidable wedge member 44, the lengthwise position of the wedge member determining the heightwise position of the post 38 with its heel support 36. In order to adjust the heightwise position of the heel support in accordance with the size and style of last, the wedge member 44 is arranged to be moved by the operator from the front of the machine. The wedge member is recessed near its forward end at 46 to receive the angularly disposed end 48 of an L-shaped rod 50 (Fig. 4) which extends forwardly through a flange 52 at the forward end of the carriage 30 and is provided with a handle 54 by which the wedge 44 may be moved lengthwise of the carriage.

Located forwardly of the heel support is a support 56 for the hinge of the last, the upper end of this support being provided with a facing 58 of suitable material such as leather. The support 56 rests on a wedge 60 carried by a slide 62. A handel 64 (Fig. 4) is connected to the wedge 60 to facilitate its adjustment, and accordingly the adjustment of the heightwise position of the support. The slide 62 is mounted for adjustment lengthwise of the shoe and for this purpose it has a dovetail connection with a post 66 extending upwardly from the carriage 30.

The forepart of the last rests on a toe support 70 which is carried by a vertically movable post 72 similar to the post 38. A wedge 74 is provided for adjusting the heightwise position of the post and is arranged to be operated by a handle 76 carried by the forward end of an L-shaped rod 78, the rearward end of which extends into a recess 80 near the forward end of the wedge. The work-engaging surface of the toe support 70 is formed of a leather cover 82 backed up by a plurality of small plate members 84 (Figs. 5, 6 and 7) which are individually movable and adapt themselves to the shape of the forepart of the last so that the last bears on the toe support with a substantially uniform pressure throughout the area of the work-engaging surface of the support. Each of the plates 84 is supported for limited universal movements. For this purpose a pin 86 (Fig. 6) depends from each of the plates and is provided at its lowermost portion with a ball 88 which fits into a socket in one of three triangular plates 90. As shown in Fig. 7 the plates 84 are arranged in three groups of three each, each of the groups being in turn supported by a plate 90. Each of the three plates 90 is in turn mounted for universal movements by reason of a ball-and-socket connection 92 with a support 94. Thus it will be seen that each of the three supporting plates 90 is mounted for limited universal movement and each of the plates 90 carries three plates 84 which are in turn mounted on the plates 90 for limited universal movement. By reason of this arrangement when the lasted shoe is placed on the toe support and pressure is applied the plates 84 will adjust themselves to the contour of the forepart of the last so that the pressure applied is uniform and because a large area of the shoe is engaged by the leather cover 82, the unit pressure applied to the shoe is not excessive.

Further to permit the toe support to accommodate itself to the forepart of the last the support 94 is mounted for limited rocking movement about an axis transversely of the forepart. As shown in Figs. 6 and 8, the support 92 has a pair of spaced depending flanges 96, the lower edges of which are curved as shown in Fig. 5 and rest on a correspondingly curved surface 98 of a block 100. A pin-and-slot connection 102 between the support and the block limits the amount of rocking movement of the support. The block 100 has a dovetail connection with the upper end of the post 72 thereby to permit lengthwise adjustment of the block relatively to the shoe to accommodate shoes of different lengths.

The present apparatus is designed to enable cement attachment of soles to Goodyear Welt shoes. Consequently, provision is made for supporting the welt of the shoe against pressure applied thereto in the sole-attaching operation. For this purpose a welt support 104 is provided, details of which are illustrated in Figs. 4 and 11 to 14. This welt support comprises a plurality of plates 106 which are substantially flat except for the edge portions which are curved as shown at 108 (Fig. 14). The upper portion of each plate has a concave edge portion 110 which joins the top of the plate at an acute angle such that the portion 112 formed thereby is shaped to enter the welt crease of the shoe as shown clearly in Fig. 6. The curved edge portions 108 nest together as shown in Fig. 14 and in effect constitute hinge portions about which the plates may pivot with respect to one another to accommodate the curved portions of the shoe as indicated in Fig. 14. In order to maintain the plates constituting the welt support in assembled relation, flexible cables 114 pass through apertures 116 provided in the inner margins of the plates, one end of each cable being soldered or otherwise suitably secured to a thick supporting plate 118 (Fig. 12) secured to the plate 106 at one end of the welt support. The other end of each cable terminates in an enlarged threaded portion 120 (Fig. 11) each of which portions is surrounded by a spring 122 receivable at one end in a recess 124 in a supporting plate 126 at the adjacent end of the welt support. Spring retainers 128 adjustably held by nuts 130 act, in cooperation with the springs, to maintain the plates yieldingly in their assembled relation. Each of the cables 114 is spaced from the plates 106 by a small spring 132 which acts as a flexible bushing and minimizes wear on the cable during manipulation of the welt support in fitting it to the contour of the shoe.

The welt support 104 is carried by a bed which includes a pair of curved plates 134 (Figs. 4, 5 and 6) pivoted together at 136 (Fig. 4) so that the plates can be moved toward and away from each other in accordance with the size of the shoe to be operated upon. These plates are in turn carried by a support 138 which includes side walls 140 having arcuate lower edges 142 (Figs. 3 and 5). A base 144 on the carriage 30 has side walls, the upper edges of which are curved at 146 in a manner complemental to the curvature of the edges 142 of the walls 140, so that the support 138 may be rocked about an axis extending transversely of a shoe and located substantially on the shoe bottom in the vicinity of the ball line thereby to change the angular relation between the supporting plates and the toe and heel supports in accordance with the toe spring of the last. A clamping plate 148 (Fig. 3) is provided for clamping the support 138 in adjusted position. To this plate is secured a screw extending through one of the walls of the base 144 to receive a nut 150 by which the wall 140 may be clamped between the wall of the base 144 and the plate 148.

In order to accommodate lasts the foreparts of which have different swings, the base 144 is mounted for adjustment about a vertical axis. For this purpose it is pivoted by a screw 152 (Fig. 5) to the carriage 30. This screw has a bearing portion 154 between the head and the threaded portion so that the screw will not be tightened sufficiently to clamp the base 144 against movement. It will be understood, however, that the weight of the parts carried thereby is sufficient to maintain it against accidental movement from its adjusted position.

As shown in Fig. 4 the welt support is designed to provide support for the welt from approximately the ball line at the inside of the shoe around the forepart rearwardly beyond the ball line at the outside of the shoe to a position adjacent to the heel breast line. The plates 134 underlying the welt support maintain the upper surface of the support in a plane from the ball line at the inside of the shoe around the toe end thereof. Because of the curvature of the shoe bottom at the outside, the welt supporting bed is constructed to permit the upper surface of the welt support to conform to this curvature and to be adjustable for curvatures of different shoes.

As shown most clearly in Fig. 3 a holder 156 is secured to one of the walls 140 and is provided in its bottom with a layer of soft rubber 158. A plurality of vertically disposed plates 160 rest on the soft rubber layer 158 and are of different heights to provide a curved supporting surface as shown in Fig. 3. A leather cover 162 overlies the upper ends of the plates 160 and is secured by screws 164 to the adjacent end of the supporting plate 134. Until the plates 160 are locked against vertical movements by means to be described they are capable of being moved downwardly with respect to one another so that the supporting surface can be made to conform to the curvature of the shoe bottom. In locating a shoe on the press member the welt is brought into engagement with the support as shown in Fig. 4 and the individual plates of the welt support overlying the plates 160 will move vertically by pressure applied by the operator through the shoe causing like movement of the plates 160 until the welt is properly supported.

In order that the welt support will sustain the pressure applied to the shoe bottom in the sole attaching operation, the plates 160 are locked against vertical movements after the shoe has been thus positioned. The plates 160 are provided with elongated apertures 166 (Fig. 3) through which extends a rod 168, one end of which is threaded to receive a split locking nut 170 located in a recess in the support 138. The other end of the rod extends through a block 172 located adjacent the rearmost plate 160. This end of the rod has pivoted to it a cam 174 (Fig. 4) to which is connected a handle 176 whereby the cam may be moved about its pivot pin 178. With the cam in the position shown in Fig. 4 the plates 160 are pressed together with sufficient force to prevent relative heightwise movement thereof under normal operating pressures. When, however, the handle 176 is moved in a clockwise direction as viewed in Fig. 4, the pressure exerted on the plates 160 is relieved and the plates are then free to be moved under light pressure in a vertical direction with respect to one another. The nut 170 (Fig. 3) permits the rod 168 to be initially positioned so that the required pressure is exerted on the plates when the cam is moved into the position shown in Fig. 4. The nut 170 is provided with a binding screw 180 by which the nut may be tightened on the rod 168 to prevent its accidental turning relatively thereto.

That end of the welt support to which the plate 118 is secured (Fig. 4) is connected to the curved plate 134 on which it rests. Pivoted at 182 to the plate 118 is a rearwardly extending rod 184 which is secured in properly adjusted position by a setscrew 186 to a pivoted block 188. This block is pivoted to the plate 134 by a pin 190 and is provided with a forwardly extending arm 192 connected by a spring 194 to the plate 134. The arrangement is such that the spring acting through the arm 192 urges the block 188 in a counterclockwise direction to move the adjacent end of the welt support inwardly toward the shoe.

In presenting a shoe to the shoe support the operator places the shoe on the heel and toe supports which have been previously positioned in accordance with the size of the shoe to be operated upon. The support 138 (Fig. 5) will be clamped in the proper position in accordance with the toe spring of the shoe and the base 144 will be positioned in accordance with the toe swing. In placing the shoe on the toe and heel supports the welt engages the top surface of the welt support which is wrapped around the shoe by the hands of the operator and assumes the position shown in Fig. 4. The plates 160 (Fig. 3) will assume such positions that the heightwise curvature of that portion of the welt support lying thereabove will conform to the heightwise curvature of the welt at the outer side of the shoe. With the shoe and the welt support thus positioned the handle 176 is moved by the operator to clamp the plates 160 together and to the forward end of the holder 156 thereby in effect solidifying that portion of the bed 138 underlying the leather cover 162 so that when pressure is applied to the shoe bottom the welt will be adequately supported around the shoe from the ball line at the inner side to the heel breast line at the outer side of the shoe.

Each of the pressure applying members 28 by which pressure is applied to attach a sole to the shoe bottom comprises an inflatable pressure applying pad 200 (Fig. 5) supported by a pad carrier 202. The pad includes a diaphragm of leather, rubber or like material 204 forming one wall of a fluid tight casing having an upper wall 206 and side walls 208. The diaphragm 204 is secured to the side walls 208 in fluid tight relation by a clamping strip 210 held by screws 212 in engagement with the under surface of the diaphragm around its periphery. The pad 200 is secured by screws 214 (Fig. 3) to depending arms 216 of the carrier 202. The carrier with its pad is moved by mechanism to be described into and out of cooperative relation to a shoe on the shoe support and when moved into operative relation to the shoe air or other fluid medium under pressure is introduced into the chamber of which the diaphragm 204 forms one wall so that the diaphragm exerts pressure on the outsole thereby to effect its attachment to the shoe bottom.

Provision is made for locking the pad carrier 202 to the shoe support prior to the introduction of pressure fluid into the pad 200. As shown in Figs. 1, 3, 5 and 15, two sets of arms 220 of two pairs each are pivoted by pins 222 to the flanges 52 at the front and rear ends of each carriage. The arms 220 of each pair are located on opposite sides of the respective flange and are connected by pins 224 (Fig. 15). The pairs of arms of each set are connected by a spring 226 hooked about the pins 224 which urges the pairs of each set toward each other into engagement with pins 228 carried by the adjacent flange 52. The upper ends of the arms carry rolls 230 which seat in recesses 232 in the lower ends of the arms 216 extending downwardly from the carrier 202. When the rolls 230 are thus located the pad carrier is locked against upward movement relatively to the shoe support so that when pressure fluid is admitted into the pressure applying pad 200 pressure is applied through the diaphragm 204 to attach the sole to the shoe bottom.

For moving the pressure applying member into and out of operative relation to the shoe support at the loading station 24 (Fig. 1) a lifting beam 236 (Figs. 1, 2, 9 and 10) is provided. This beam comprises a pair of spaced arms 238 connected at their forward ends by a cross arm 239 pivoted on a shaft 240 which is carried by a pair of arms 242 which extend upwardly from a rearward extension 244 of the table 10. For moving the beam into and out of engagement with the pad carrier 202 a piston 248 movable in a cylinder 250 (Figs. 1 and 2) is provided. The upper end of the piston is connected to a rod 252 extending between the arms 238 of the lifting beam, the upper end of the piston having a slotted portion through which the rod 252 extends so that upon vertical movement of the piston within its cylinder the beam 236 is rocked about the shaft 240.

Mechanism is provided for locking the lifting beam to the pad carrier when the forward end of the beam is in its lowermost position. For this purpose a shaft 254 is carried by a pair of ears 256 extending upwardly from the arms 238. Mounted on this shaft in spaced relation are arms 258 each of which extends above and below the shaft. Inwardly extending pins 260 are carried at the outer ends of the arms 258. A handle 262 extending upwardly from the shaft 254 is provided for rocking the shaft and with it the arms 258. Each of the pad carriers 202 (Fig. 9) has a longitudinally extending rib 264 at the central portion of which is a pair of upwardly extending arms 266 providing between them a recess 268. With the lifting beam in its lowermost position the shaft 254 is located within the recess 268 and the arms 258 are positioned at opposite sides of the rib 264. The arms 266 are provided at opposite sides with latch plates 270 so arranged that when the shaft 254 is rocked by the handle 262 in a counterclockwise direction as viewed in Figs. 1 and 10, the pins 260 are positioned below notches 272 of the latch plates 270 so that the lifting beam is locked to the pad carrier to move the carrier upwardly when the lifting beam is moved upwardly by pressure fluid introduced into the cylinder 250 below the piston 248.

Before the pad carrier with its pressure-applying pad can be moved upwardly, however, the carrier must be released from the shoe support by moving the arms 220 carrying the rolls 230 outwardly out of locking engagement with the arms 216. As shown in Figs. 3, 5, 9 and 10 the arms 216 have outwardly projecting portions 274 provided with vertical T-slots 276 (Fig. 9) carrying release plates 280 which, as shown in Fig. 5, are normally urged upwardly by springs 282 into positions determined by the engagement of pins 284 with the under surfaces of the extensions 274. The release plates have inclined edge portions 286 (Fig. 15) engageable with pins 288 in the arms 220 when the plates 280 are moved downwardly thereby to cam the arms 220 outwardly against the force exerted by the springs 226 thus moving the rolls 230 out of locking engagement with the arms 216 depending from the pad carrier. The release plates 280 have upwardly extending projections 290 (Figs. 1 and 10) which are engaged, when the lifting beam is moved into locking engagement with the pad carrier, by arms 292 carried by shafts 294 journaled in brackets 296 extending upwardly from the arms 238. The shafts 294 also carry upwardly extending arms 298 connected by links 300 with arms 302 secured to the shaft 254. When the shaft 254 is moved by the handle 262 in a counterclockwise direction to lock the lifting beam to the pad carrier the arms 292 are simultaneously moved to engage the extensions 290 of the release plates 280 whereupon the release plates are forced downwardly to separate the arms 220 and free the pad carrier from locking engagement with the rolls 230 carried by these arms. Upon introduction of pressure into the lower end of the cylinder 250 the lifting beam may be moved upwardly carrying with it the pressure applying member 28 whereupon the operator may remove a shoe from the support and position another one thereon for a sole-attaching operation.

Introduction of air under pressure into the pressure applying pad 200 and exhaust of air therefrom is controlled by movement of the handle 262 simultaneously with the locking of the pad carrier 202 to the shoe support and with the release of the pad carrier therefrom. Extending rearwardly from one of the arms 258 on the shaft 254 is an arm 310 (Figs. 9 and 10) in which is carried the end of an air hose 312 connected to any suitable source of compressed air. Each of the pad carriers 202 is provided with an inlet valve 314 through which air may be introduced into the pad. With the handle 262 in the other position from that shown in Fig. 10, the release plates 280 are in their upper positions and the pad carrier is locked to the shoe support. The arm 310 is positioned at this time with the air hose 312 coupled to the valve 314 on the pad carrier permitting the introduction of air under pressure into the pad 200 so that the diaphragm 204 acts to press the sole against the shoe bottom as indicated in Fig. 5.

With the lifting beam 236 moved out of engagement with the pad carrier the air hose 310 is disconnected from the valve 314 so that the pad carrier can be moved along the table 10. The valve 314 does not permit exhause of air from the pad so that the shoe remains under pressure until air is subsequently permitted to exhaust through a valve 316. This valve has an upwardly extending stem 318 positioned for engagement by an arm 320, extending forwardly of the arm 258 carried by the shaft 254 when the handle 262 is rocked in a counterclockwise direction, provided that the lifting beam is in engagement with the pad carrier. When the lifting beam has been thus positioned at the conclusion of a pressure-applying operation the handle 262 is moved in a counterclockwise direction into the position shown in Fig. 10 to move the release plates 280 downwardly freeing the pad carrier from the shoe support. During this movement the arm 320 (Fig. 10) depresses the valve stem 318 which permits air to exhaust from the pressure-applying pad. Thus it will be seen that the admission and exhaust of air is automatically controlled during locking and unlocking of the pad carrier with respect to the shoe support.

Upward movement of the lifting beam 236 is controlled by a treadle 322 (Fig. 2) pivoted at 324 in the base of the machine. A link 326 connects the treadle to an arm 328 of a two-position valve 330. A spring 332 normally maintains the treadle in an elevated position as shown in Fig. 2. With the parts in the positions shown in Fig. 2 air passes from a suitable source through a pipe 334, valve 330 and a pipe 336 into the lower end of the cylinder 250 so that the piston 248 is in its uppermost position with the lifting beam 236 elevated. Upon depression of the treadle 322 the valve is moved into its other position permitting exhaust of the air from the cylinder 250 through the pipe 336, valve 330 and a pipe 338. A spring 340, connected between the lifting beam and the table, assists in moving the lifting beam downwardly into operative position with respect to a press member which has been moved thereunder.

In the operation of the machine it will be assumed that a press member in which there is a shoe under pressure has been moved under the lifting beam whereupon the treadle 322 is depressed and the lifting beam moved downwardly into operative relation to the press member. The handle 262 is then moved in a counterclockwise direction into the position shown in Fig. 10 whereupon the arm 320 (Fig. 10) opens valve 316 and air exhausts from the pressure-applying pad. This movement of the handle 262 causes the release plates 280 to force the sets of arms 220 (Fig. 3) apart moving rolls 230 out of engagement with the recesses in the arms 216. At the same time the pins 260 in the arms 258 move under notches 272 of the latch plates 270 locking the pad carrier to the lifting beam.

The operator now releases the treadle to admit air into the cylinder 250 whereupon the lifting beam with the pressure-applying member, moves upwardly as indicated in Fig. 2 to permit removal of the shoe from the press member. The operator now positions another shoe and sole on the press member making any adjustments which may be required if the shoe to be operated upon is of a different size or style from the shoe which has been removed from the press member. The welt lies on the upper surface of the welt support, and with a sole spotted on the bottom of the shoe the operator again steps on the treadle exhausting air from the cylinder 250 whereupon the lifting beam with the pressure-applying member moves downwardly. The handle 262 is now moved into the other position from that shown in Fig. 10 whereupon the release plates 280 are permitted to move upwardly under the influence of the springs 282 (Fig. 5) so that the pad carrier is locked to the shoe support. At the same time the arms 258 move out of the position shown in Fig. 10 so that the lifting beam is free of the pad carrier and the arm 310 moves downwardly coupling the air hose to the valve 314, thereby to supply air to the pad. After sufficient air is supplied thereto, the treadle 322 is again released and the lifting beam is moved upwardly. The operator now moves the press member with the shoe along the table out of the loading station and moves another press member into the loading station whereupon the operations just described are repeated.

After these operations have been repeated on each of the press members carried by the table 10 all of the press members may be moved back to the other end of the table whereupon the operations are repeated on the first press member. Each shoe is under pressure for a considerable length of time depending on the number of press members on the table which may be readily varied to suit the operating conditions.

Having thus described my invention what I claim as new and desire to secure by Letters Patent of the United States is:

1. Apparatus for applying pressure to shoe bottoms comprising a supporting table, a plurality of press members carried by said table for movement into and out of a loading station thereon, each of said press members comprising means for supporting a shoe in inverted position and a pressure-applying pad engageable with the bottom of a shoe on the supporting means, and power-operated means at said loading station independent of the movement of the press members for lifting a pad out of engagement with the bottom of a shoe on the associated supporting means.

2. Apparatus for applying pressure to shoe bottoms comprising a supporting table, a plurality of press members carried by said table for movement into and out of a loading station thereon, each of said press members comprising means for supporting a shoe in inverted position and a pressure-applying pad engageable with the bottom of a shoe on the supporting means, power-operated mechanism independent of said press members at said loading station independent of the movement of the press members for moving a pad into and out of operative relation to a shoe on the associated supporting means, and means for locking said pad in operative relation to the shoe.

3. Apparatus for applying pressure to shoe bottoms comprising a supporting table, a plurality of press members carried by said table for movement into and out of a loading station thereon, each of said press members comprising means for supporting a shoe in inverted position and a pressure-applying pad engageable with the bottom of a shoe on the supporting means, power-operated mechanism independent of said press members at said loading station for moving a pad into and out of operative relation to a shoe on the associated supporting means, means for locking said pad in operative relation to the shoe, and means for thereafter applying pressure through said pad to the shoe bottom.

4. Apparatus for applying pressure to shoe bottoms comprising a supporting table, a plurality of press members carried by said table for movement into and out of a loading station thereon, each of said press members comprising means for supporting a shoe in inverted position and an inflatable pressure-applying pad engageable with the bottom of a shoe on the supporting means, power-operated mechanism independent of said press members at said loading station for moving a pad into and out of operative relation to a shoe on the associated supporting means, means for locking said pad in operative relation to the shoe on the supporting means, and means for applying pressure fluid to said pad thereby to apply pressure to the shoe bottom.

5. In a machine for applying pressure to shoe bottoms, means for supporting a shoe in inverted position, a pressure-applying member movable into and out of engagement with the bottom of a shoe on the support, means for thus moving said member, and means operative in response to movement of said member into engagement with the bottom of the shoe for locking said member at its opposite ends against upward movement.

6. In a machine for applying pressure to shoe bottoms, means for supporting a shoe in inverted position, a pressure-applying member movable into and out of engagement with the bottom of a shoe on the support, means for thus moving said member, means operative in response to movement of said member into engagement with the bottom of the shoe for locking said member at its opposite ends against upward movement, and means carried by said member for releasing said locking means at the conclusion of a pressing operation.

7. In a machine for applying pressure to shoe bottoms, means for supporting a shoe in inverted position, a pressure-applying member movable into and out of engagement with the bottom of a shoe on the support, means for thus moving said member, means operative in response to movement of said member into engagement with the bottom of the shoe for locking said member at its opposite ends against upward movement, means carried by said member for releasing said locking means at the conclusion of a pressing operation, and means on said moving means for actuating said releasing means.

8. In a machine for applying pressure to shoe bottoms, means for supporting a shoe in inverted position, an inflatable pressure-applying member movable into and out of engagement with the bottom of a shoe on the support, power-operated means for thus moving said member, means operative in response to movement of said member into engagement with the bottom of the shoe for locking said member against upward movement, and means for inflating said member to apply pressure to the shoe bottom.

9. In a machine for applying pressure to shoe bottoms, a base, means carried by the said base for supporting a shoe in inverted position, a pressure-applying member movable into and out of engagement with the bottom of a shoe on the supporting means, means for thus moving said member, arms depending from opposite ends of said member, each of said arms having oppositely disposed recesses in its edge walls, pairs of spaced arms extending upwardly from and pivoted to said base, rolls carried by the upper ends of said last-named arms receivable in said recesses when the pressure-applying member is in pressing position, and springs urging the arms of each pair toward the other pair.

10. In a machine for applying pressure to shoe bottoms, a base, means carried by the said base for supporting a shoe in inverted position, a pressure-applying member movable into and out of engagement with the bottom of a shoe on the supporting means, means for thus moving said member, arms depending from opposite ends of said member each of said arms having oppositely disposed recesses in its edge walls, pairs of spaced arms extending upwardly from and pivoted to said base, rolls carried by the upper ends of said last-named arms receivable in said recesses when the pressure-applying member is in pressing position, springs urging the arms of each pair toward the other pair, and means carried by said pressure-applying member for separating said last-named arms at the conclusion of a pressing operation thereby to permit movement of said pressure-applying member out of engagement with the bottom of the shoe.

11. In a machine for applying pressure to shoe bottoms, a base, means carried by said base for supporting a shoe in inverted position, a pressure-applying member movable into and out of engagement with the bottom of a shoe on the supporting means, means for thus moving said member, depending arms carried by opposite ends of said member, each of said arms having oppositely disposed recesses in its edge faces, pairs of spaced arms extending upwardly from and pivoted to said base, rolls carried by the upper ends of said last-named arms receivable in said recesses when the pressure-applying member is in pressing position, springs urging the arms of each pair toward the other pair thereby to move said rolls into locking engagement with the depending arms, cam means carried by each of said depending arms movable downwardly relatively thereto, pins carried by the upwardly extending arms in position to be engaged by said cams upon downward movement of the latter thereby to separate the arms and move the rolls out of locking engagement with said recesses, and means carried by said moving means for thus moving said cam means.

12. In a machine for applying pressure to the bottoms of welt shoes, means for supporting a shoe in inverted position, said means including a welt support comprising a plurality of vertically disposed plate members, the upper edges of which provide a substantially continuous welt-supporting surface, said plate members being substantially flat with nested curved vertical edge portions permitting relative pivotal movements of said plates to conform to the outline of the forepart of the shoe, and means for applying pressure to the bottom of a shoe thus supported.

13. In a machine for applying pressure to the bottoms of welt shoes, means for supporting a shoe in inverted position, said means including a welt support comprising a plurality of vertically disposed plate members the upper edges of which provide a substantially continuous welt-supporting surface, yielding means interconnecting said plate members for relative vertical movements to conform to the heightwise curvatures of the welt of the shoe, and a bed carrying said welt support with the plates in the desired relative positions.

14. In a machine for applying pressure to the bottoms of welt shoes, means for supporting a shoe in inverted position, said means including a welt support comprising a plurality of vertically disposed plate members the upper edges of which provide a substantially continuous welt-supporting surface, yielding means interconnecting said plate members for relative vertical movements to conform to the heightwise curvatures of the welt of the shoe, a bed carrying said welt support with the plates in the desired relative positions, said bed including a yielding base, a plurality of rigid plates extending vertically upward from said base and independently movable heightwise to vary the contour of the supporting surface of said bed, and means for locking said plates against relative vertical movements prior to the application of pressure to the shoe bottom.

15. In a machine for applying pressure to the bottoms of welt shoes, means for supporting a shoe in inverted position, said means including a welt support comprising a plurality of vertically disposed plate members the upper edges of which provide a substantially continuous welt-supporting surface, yielding means interconnecting said plate members for relative vertical movements to conform to the heightwise curvatures of the welt of the shoe, a bed carrying said welt support with the plates in the desired relative positions, means adjustably mounting said bed for rocking movement about an axis extending transversely of a shoe on the supporting means in the vicinity of the ball line, and means for locking said bed in adjusted position.

16. In a machine for applying pressure to the bottoms of welt shoes, means for supporting a shoe in inverted position, said means including a welt support comprising a plurality of vertically disposed plate members the upper edges of which provides a substantially continuous welt-supporting surface, yielding means interconnecting said plate members for relative vertical movements to conform to the heightwise curvatures of the welt of the shoe, a bed carrying said welt support with the plates in the desired relative positions, said bed including rigid supporting plates extending from the ball line on the inner side of a shoe carried by the supporting means and around the forepart, and a vertically yielding portion at the end of the plate on the outer side of the shoe to enable vertical movements of the plate members of the welt support in accordance with the heightwise curvature of the welt at the outer side of the shoe, and means for solidifying said yielding portion prior to the application of pressure to the bottom of the shoe.

17. In a machine for applying pressure to the bottoms of welt shoes, means for supporting a shoe in inverted position, said means including a welt support comprising a plurality of vertically disposed plate members the upper edges of which provide a substantially continuous welt supporting surface, yielding means interconnecting said plate members for relative vertical movements to conform to the heightwise curvatures of the welt of the shoe, a bed carrying said welt support with the plates in the desired relative positions, said bed including rigid supporting plates extending from the ball line on the inner side of a shoe carried by the supporting means and around the forepart, and a vertically yielding portion at the end of the plate on the outer side of the shoe to enable vertical movements of the plate members of the welt support in accordance with the heightwise curvature of the welt at the outer side of the shoe, means mounting said bed for rocking movement about an axis extending transversely of the shoe carried by the supporting means in the vicinity of the ball line, means for locking said bed in adjusted position, and means for solidifying said yielding portion prior to the application of pressure to the bottom of the shoe.

18. A welt support comprising a plurality of substantially flat plate members, means urging said members into face-to-face relation, said plate members having nested curved vertical edge portions displaced from the planes of said plate members permitting relative pivotal movements of said plate members to conform to the contour of a shoe, and having other edge portions providing a welt-supporting surface.

19. A welt support comprising a plurality of substantially flat plate members having nested curved vertical edge portions permitting relative pivotal movements to conform to the outline of the forepart of a shoe, flexible cables passing through said members adjacent to said curved portions for holding the members in assembled relation, and means urging said plate members into face-to-face relation.

20. A welt support comprising a plurality of substantially flat plate members having nested curved vertical edge portions permitting relative pivotal movements to conform to the outline of the forepart of a shoe, flexible cables passing through the said members adjacent to said curved portions for holding the members in assembled relation, springs surrounding said cables acting as flexible bushings between the cables and the plate members, and means urging said members into face-to-face relation.

21. In combination, a welt support comprising a plurality of substantially flat plate members, means urging said members into face-to-face relation, said members having nested curved vertical edge portions displaced from the planes of said plate members permitting relative pivotal movements of said members to conform to the contour of a shoe and having other edge portions providing a welt-supporting surface, and a bed for said welt support, said bed having contiguous portions relatively adjustable vertically to vary the heightwise contour of the work-engaging surface of the welt support.

22. In combination, a welt support comprising a plurality of substantially flat plate members, means urging said members into face-to-face relation, said members having nested curved vertical edge portions displaced from the planes of said plate members permitting relative pivotal movements of said members to conform to the contour of a shoe and having other edge portions providing a welt-supporting surface, a bed for said welt support, said bed having contiguous portions relatively adjustable vertically to vary the heightwise contour of the work-engaging surface of the welt support, and means for clamping said portions together against relative vertical movements.

23. In a machine for applying pressure to shoe bottoms, means for supporting a shoe for the application of pressure to the bottom thereof including a toe support engageable with a substantial area of the toe end of a shoe, said toe support including a plurality of closely associated supporting plates individually mounted for rocking movements to conform to the shape of the toe end of a shoe, a cover extending over said plates to form a continuous shoe-engaging surface, and means for applying pressure to the bottom of a shoe thus supported.

24. In a machine for applying pressure to shoe bottoms, a toe support comprising a plurality of toe-supporting plates mounted for individual universal rocking movements to conform to the shape of the toe end of a shoe, a cover extending over said plates to form a continuous supporting surface, and means for applying pressure to the bottom of a shoe thus supported.

25. In a machine for applying pressure to shoe bottoms, a toe support comprising a plurality of supporting plates, a plurality of supporting members arranged to support said plates in groups of at least two, means mounting said supporting plates on said members for individual universal rocking movements, means mounting said supporting members for individual universal rocking movements, and a cover extending over said plates to form a continuous supporting surface.

26. In a machine for applying pressure to shoe bottoms, a toe support, means mounting said toe support for rocking movement about an axis transverse to the length of a shoe on the support, said toe support including a plurality of supporting members carried by said mounting means for individual universal rocking movements, a plurality of work-supporting plates carried by each of said members, means mounting said work-supporting plates for universal rocking movement on the supporting members whereby the individual supporting plates adapt themselves to the curvature of the toe end of the shoe, and a cover extending over said plates to form a continuous supporting surface.

FRANK E. COLE.

REFERENCES CITED

The following references are of record in the file of this patent:

UNITED STATES PATENTS

| Number | Name | Date |
|---|---|---|
| 217,687 | Gifford | July 22, 1879 |
| 1,945,762 | Weiss | Feb. 6, 1934 |
| 2,065,260 | Barge | Dec. 22, 1936 |
| 2,125,930 | Lancaster | Aug. 9, 1938 |
| 2,272,183 | Butler | Feb. 10, 1942 |
| 2,285,398 | Amico | June 9, 1942 |
| 2,302,757 | Filsinger | Nov. 24, 1942 |
| 2,375,346 | Card | May 8, 1945 |
| 2,444,969 | Woodman | July 13, 1948 |

FOREIGN PATENTS

| Number | Country | Date |
|---|---|---|
| 98,349 | Sweden | July 30, 1940 |
| 421,144 | Germany | Nov. 6, 1925 |

Certificate of Correction

Patent No. 2,529,798

November 14, 1950

FRANK E. COLE

It is hereby certified that error appears in the printed specification of the above numbered patent requiring correction as follows:

Column 12, line 70, for "disposed plate members," read *disposed thin plate members in face to face relation,*;

and that the said Letters Patent should be read as corrected above, so that the same may conform to the record of the case in the Patent Office.

Signed and sealed this 22nd day of May, A. D. 1951.

[SEAL]

THOMAS F. MURPHY,
*Assistant Commissioner of Patents.*